June 7, 1949.   O. J. MINUTO   2,472,306
TAPER MEASURING INSTRUMENT
Filed July 20, 1946
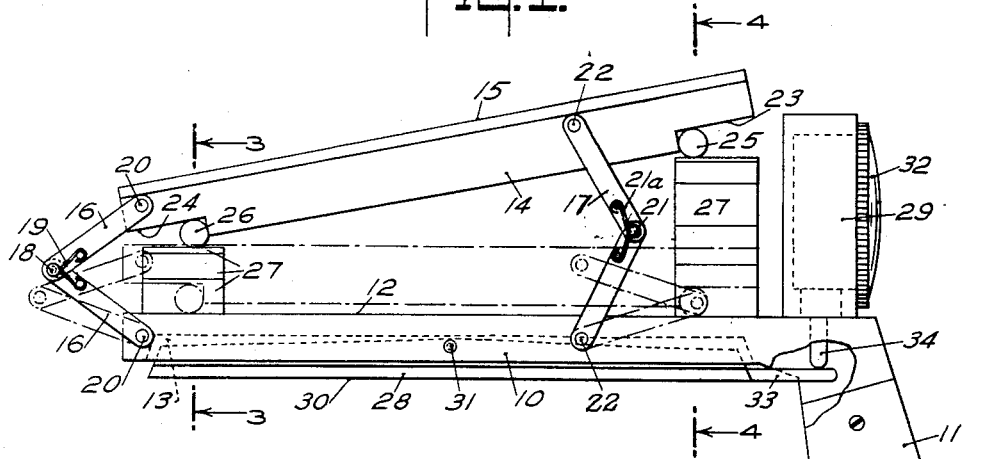
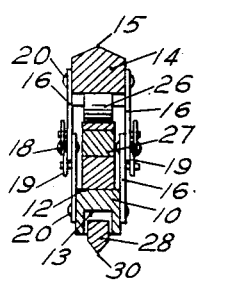
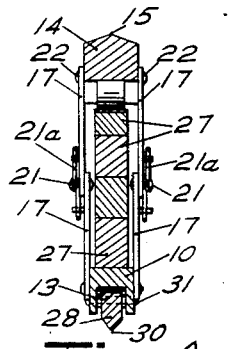
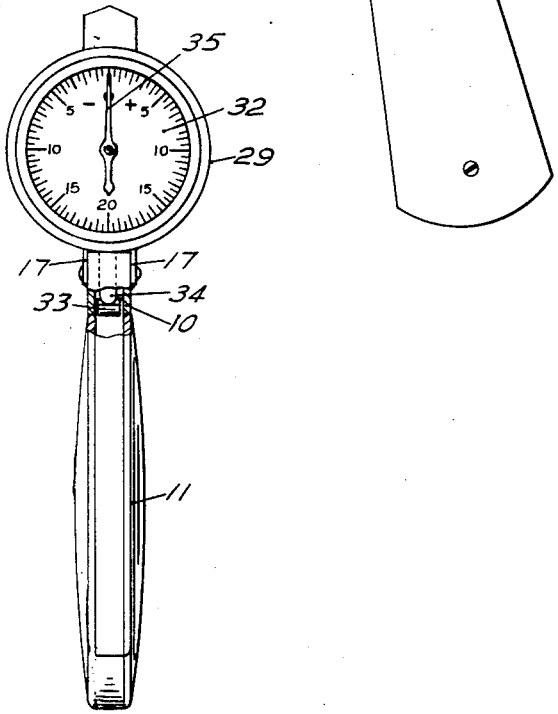
INVENTOR
OCTAVIUS J. MINUTO
BY
Barr, Borden & Fox
ATTORNEYS Patented June 7, 1949

2,472,306

UNITED STATES PATENT OFFICE 2,472,306

TAPER MEASURING INSTRUMENT

Octavius J. Minuto, Philadelphia, Pa.

Application July 20, 1946, Serial No. 685,081

3 Claims. (Cl. 33—174)

The present invention relates to testing apparatus and more particularly to a gauge for measuring the angle of tapered bores to determine the accuracy thereof.

Some of the objects of the present invention are: to provide an improved instrument for measuring the internal taper of a bore; to provide a precision instrument for testing the internal taper of a bore to ascertain whether or not it conforms to a desired taper; to provide a gauge for accurately determining the taper of a bore in a cylinder or other member and indicating during the testing operation any variation from the taper required; to provide a taper measuring instrument arranged to be set to a selected angle and thereafter inserted manually into a bore in association with an indicator arranged to visually show any variation of the bore from the set angle; and to provide other improvements as will hereinafter appear.

In the accompanying drawings, Fig. 1 represents a side elevation of a taper gauge embodying one form of the present invention; Fig. 2 represents an end elevation of the same; Fig. 3 represents a section on line 3—3 of Fig. 1; and Fig. 4 represents a section on line 4—4 of Fig. 1.

Referring to the drawings, one form of the present invention comprises an elongated base 10, attached to and arranged to be manipulated by a pistol grip type of handle 11. This base 10 is formed with a plane upper supporting surface 12 and having a groove 13 in the lower base portion extending substantially the length of the base.

In order to set the instrument for a selected angle of which the surface 12 forms one side, a sine bar 14 is provided of the usual accurate type having a precision knife edge 15, such bar 14 being connected at opposite ends respectively to the base 10 by pairs of toggle-like links 16 and 17. The links 16 are connected together by a pivot 18 and to the respective base 10 and sine bar 14 by pivots 20. A spring 19 about the pivot 18 normally biases the links 16 together. The links 17 are connected together by a pivot 21 and to the respective base 10 and sine bar 14 by pivots 22 and are biased towards each other by a spring 21ᵃ. The opposite ends of the sine bar 14 are provided respectively with recesses 23 and 24 forming angular two line bearings to seat against supporting cylinders 25 and 26, which are of the same diameter.

For setting the sine bar 14 to form a predetermined angle with the surface 12, blocks 27 are provided and arranged to be interposed between the cylinders and the base 10 in the required manner to give the desired or selected inclination of the sine bar 14. These blocks 27 are of predetermined size and precision made, so that for any selected angle one certain number of blocks are superposed between the cylinder 25 and the base 10, and another number of blocks are positioned between the cylinder 26 and the base 10. The number of blocks 27 to be used at each end of the sine bar 14 is determined from a prepared chart giving the angles resulting from any combination of the blocks.

As a means of gauging the correctness of a taper of a bore in a cylinder or other member, a sensing bar 28 is pivotally mounted in the groove 13 and projects therefrom throughout its length in the form of a knife edge 30, the function of which is to contact one face of the bore under test. This knife edge 30 is thus opposite to the sine bar knife edge 15 and lies in the same plane. The pivot 31 is located at the longitudinal center of the sensing bar 28 so that the bar 28 is accurately balanced. Any deflection of the bar 28 from a condition parallel to the base surface 12 is arranged to be indicated upon a gauge 29 having a graduated dial 32 by means of an arm 33 projecting rearwardly from the bar 28 to extend beneath the spring pressed plunger 34, it being understood that this plunger-operating mechanism for the pointer 35 is of a well-known type used in such gauges. As shown, the dial instrument is mounted on the base 10 conveniently adjacent the handle 11 so that deflections of the pointer can be readily observed. In assembled and adjusted condition the dial 32 will register zero when the sensing bar 28 is precisely parallel to the base surface 14, and hence any deflection of the bar will cause either a plus or minus change from zero by the pointer 35.

In operation, the sine bar 14 is set to the required angle, of the internal taper to be measured by building up the proper dimensioned sensing blocks 27, whereupon with the gauge bar 28 calibrated to a zero position on the gauge dial 32, the device is inserted in the bore and as long as the gauge registers zero, the taper is correct. On the other hand, if the taper is incorrect, the pointer of the gauge dial 32 will at once indicate a plus or a minus deviation, showing the variation of the taper from the correct taper angle.

Having thus described my invention, I claim:

1. An instrument for measuring the internal taper of a bore, comprising a base having a plane surface, a sine bar attached to said base opposite said surface and angularly adjustable relative thereto, means for adjusting said sine bar to a predetermined angle to said surface, a sensing bar pivoted to said base on the opposite side of said base from said sine bar, and an indicating means operated by said sensing bar and calibrated to zero when said sensing bar is parallel to said surface.

2. An instrument for measuring the internal taper of a bore, comprising a base having a plane surface, a sine bar attached to said base opposite said surface and angularly adjustable relative thereto, means for adjusting said bar to a predetermined angle to said surface, a gauge including an indicating dial, and sensing means carried by said base to enter a bore with said base and sine bar and automatically responsive to a variation of said predetermined angle for causing said indicating dial to indicate variations of said predetermined angle when said instrument is in a bore.

3. An instrument for measuring the internal taper of a bore, comprising a base having a longitudinally disposed groove in its bottom and a top plane surface, a sine bar attached to said base opposite said surface and angularly adjustable relative thereto, means for adjusting said sine bar to a predetermined angle to said surface, a sensing bar guided in said groove and projecting therefrom to take positions respectively parallel to said surface and angularly thereto, a pivot medially of said bar for mounting said bar in said groove, and an indicating means associated with said sensing bar and calibrated to zero when said sensing bar is parallel to said surface and indicating angular variations of said bar when measuring the internal taper of a bore.

OCTAVIUS J. MINUTO.

REFERENCES CITED

The following references are of record in the file of this patent:

UNITED STATES PATENTS

| Number | Name | Date |
|---|---|---|
| 2,412,569 | Dugger | Dec. 17, 1946 |